United States Patent
Jones et al.

(10) Patent No.: US 6,658,658 B1
(45) Date of Patent: Dec. 2, 2003

(54) IMPLICIT FORWARDING AND RESOLVING OF A REFERENCE MADE BY AN IMPORTING MODULE TO AN EXPORTING MODULE FOR A SPECIFIED EXPORT

(75) Inventors: Jeffrey Allen Jones, Round Rock, TX (US); Jeffrey Kobal, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/506,234

(22) Filed: Feb. 17, 2000

(51) Int. Cl.[7] ............................................. G06F 9/44
(52) U.S. Cl. ...................... 717/162; 717/163; 717/153; 717/166; 717/178; 709/331; 709/332
(58) Field of Search ................................ 717/162, 153, 717/163, 164, 178, 168, 173, 166; 709/331, 332

(56) References Cited

U.S. PATENT DOCUMENTS

| | | | | |
|---|---|---|---|---|
| 5,247,678 A | * | 9/1993 | Littleton ..................... 709/331 |
| 5,305,461 A | | 4/1994 | Feigenbaum et al. ....... 712/225 |
| 5,428,782 A | * | 6/1995 | White ........................ 709/101 |
| 5,495,612 A | * | 2/1996 | Hirayama et al. .......... 709/331 |
| 5,499,343 A | | 3/1996 | Pettus ........................ 709/203 |
| 5,528,588 A | * | 6/1996 | Bennett et al. ............... 370/60 |
| 5,535,394 A | | 7/1996 | Burke et al. ................. 717/157 |
| 5,581,768 A | * | 12/1996 | Garney et al. .............. 709/104 |
| 5,682,535 A | * | 10/1997 | Knudsen .................... 717/117 |
| 5,734,903 A | | 3/1998 | Saulpaugh et al. ......... 709/316 |
| 5,737,606 A | | 4/1998 | Cummins ................... 709/315 |
| 5,774,722 A | * | 6/1998 | Gheith ....................... 709/331 |
| 5,946,486 A | * | 8/1999 | Pekowski ................... 717/128 |
| 6,003,095 A | * | 12/1999 | Pekowski et al. ........... 717/163 |
| 6,115,710 A | * | 9/2000 | White ........................ 707/10 |
| 6,154,878 A | * | 11/2000 | Saboff ....................... 717/173 |
| 6,199,203 B1 | * | 3/2001 | Saboff ....................... 717/168 |
| 6,219,830 B1 | * | 4/2001 | Eidt et al. ................... 717/139 |

(List continued on next page.)

FOREIGN PATENT DOCUMENTS

WO    WO98/15155    4/1998

OTHER PUBLICATIONS

: Dynamic Interception of Imported Procedure Calls, IBM Technical Disclosure Bulletin, Jan. 1996, TDB≃ACC≃NO: NN9601197.*

(List continued on next page.)

Primary Examiner—Chameli C. Das
(74) Attorney, Agent, or Firm—David A. Mims, Jr.; Bracewell & Patterson, L.L.P.

(57) ABSTRACT

The present system and method improves the way of forwarding a reference from an importing module to an exporting module. The present system and method allow forwarding of a reference(s) through a forwarder exporting module for a specified export(s) when an explicit entrypoint(s) does/do not exist for the specified export(s) in the forwarder exporting module and still allow correlation from the importing module to the exporting module when the loader is loading the importing module during a load time. One or more implicit forwarder record(s) is stored in the exporting module by a linker. Each implicit forwarder record designates a respective target module. The loader determines whether an explicit entrypoint exists in the exporting module for the reference of the specified export. The loader resolves the reference by using the explicit entrypoint to determine a location of the specified export if the explicit entrypoint exists. The loader searches in a defined sequential order for the location of the specified export in a target module designated by a respective implicit forwarder record if the explicit entrypoint does not exist. The loader resolves the reference by using the implicit forwarder record if the specified export is found in a target module.

26 Claims, 9 Drawing Sheets

U.S. PATENT DOCUMENTS

| | | | |
|---|---|---|---|
| 6,253,258 B1 * | 6/2001 | Cohen | 709/331 |
| 6,499,137 B1 * | 12/2002 | Hunt | 717/164 |
| 6,507,842 B1 * | 1/2003 | Grey et al. | 707/5 |
| 6,550,060 B1 * | 4/2003 | Hammond | 717/162 |

OTHER PUBLICATIONS

: Type Safe Linking and Modular Assembly Language, author: Glew et al, ACM, 1999.*

: Linking Programs Incrementally, author: Quong et al, ACM, 1991.*

: Dynamic Linking of Software Components, author: Franz, M.; Computer, vol.: 30 Issue: 3, Mar. 1997.*

Title: Dynamic linking and environment initialization in a multi–domain process, author: Janson, ACM, Nov. 1975.*

Title: Quasi–Static Scoping: Sharing Variable Bindings Across Multiple Lexical Scopes, author: Lee et al, ACM, 1993.*

Title: Loader Standardization for Overlay Programs, author: Lanzano, ACM, Oct. 1969.*

* cited by examiner

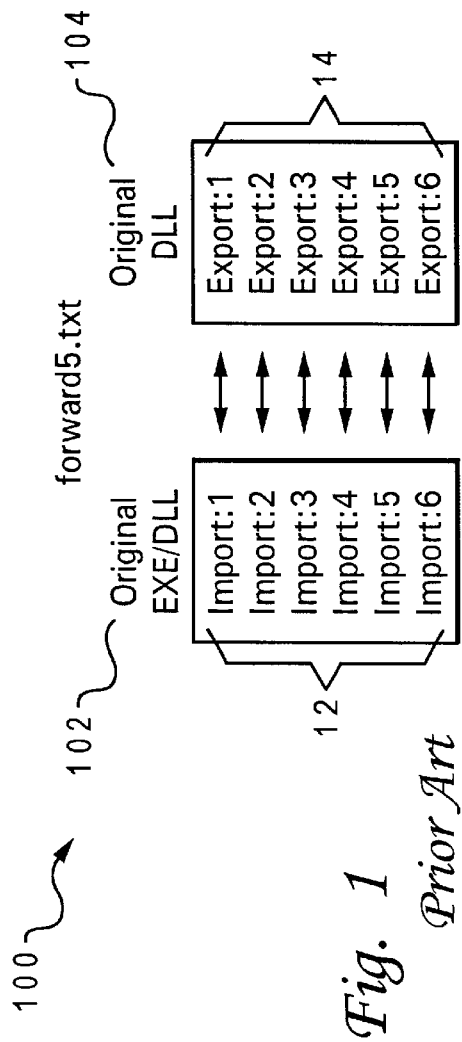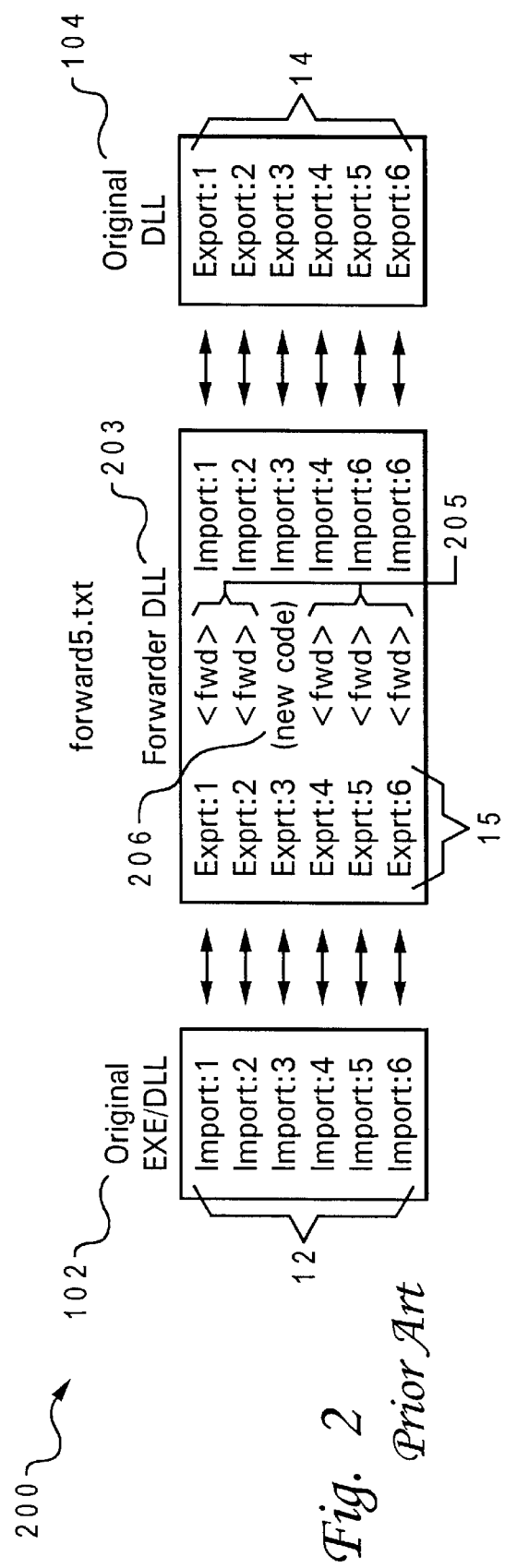
Fig. 1 Prior Art
Fig. 2 Prior Art

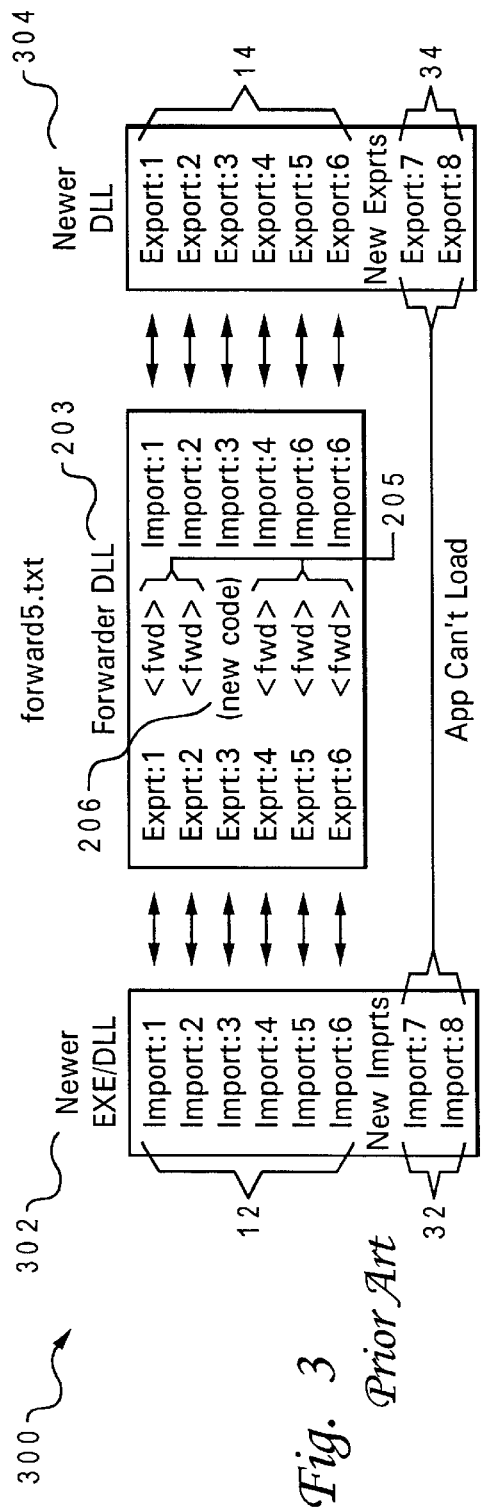
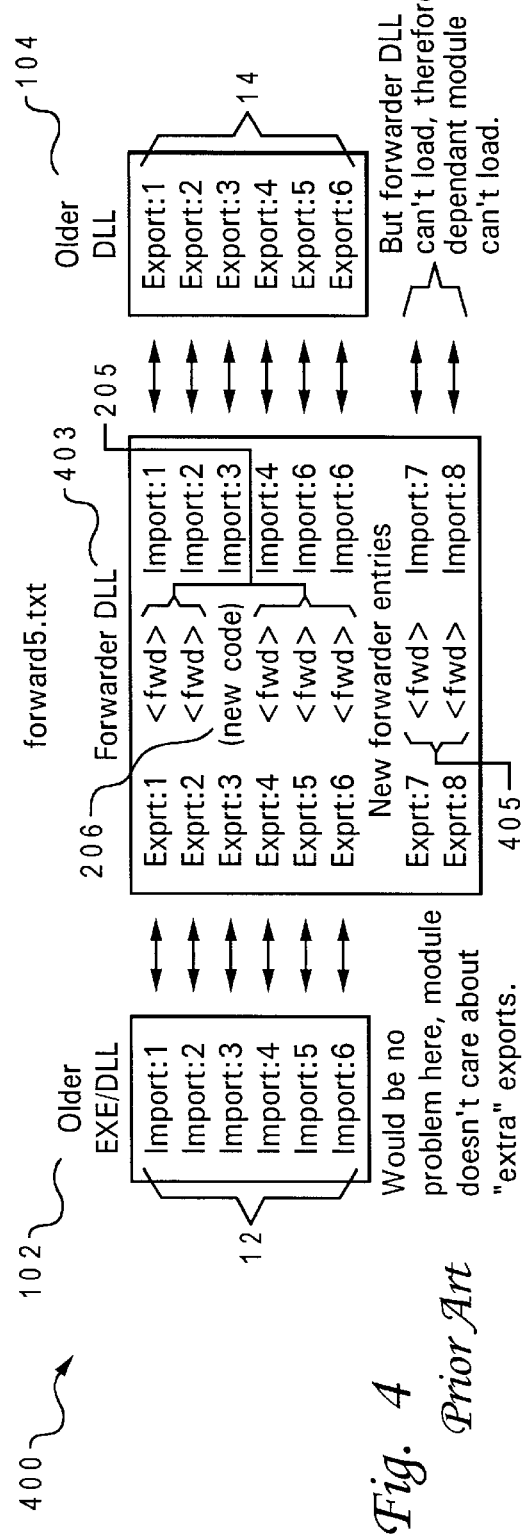
Fig. 3 Prior Art
Fig. 4 Prior Art

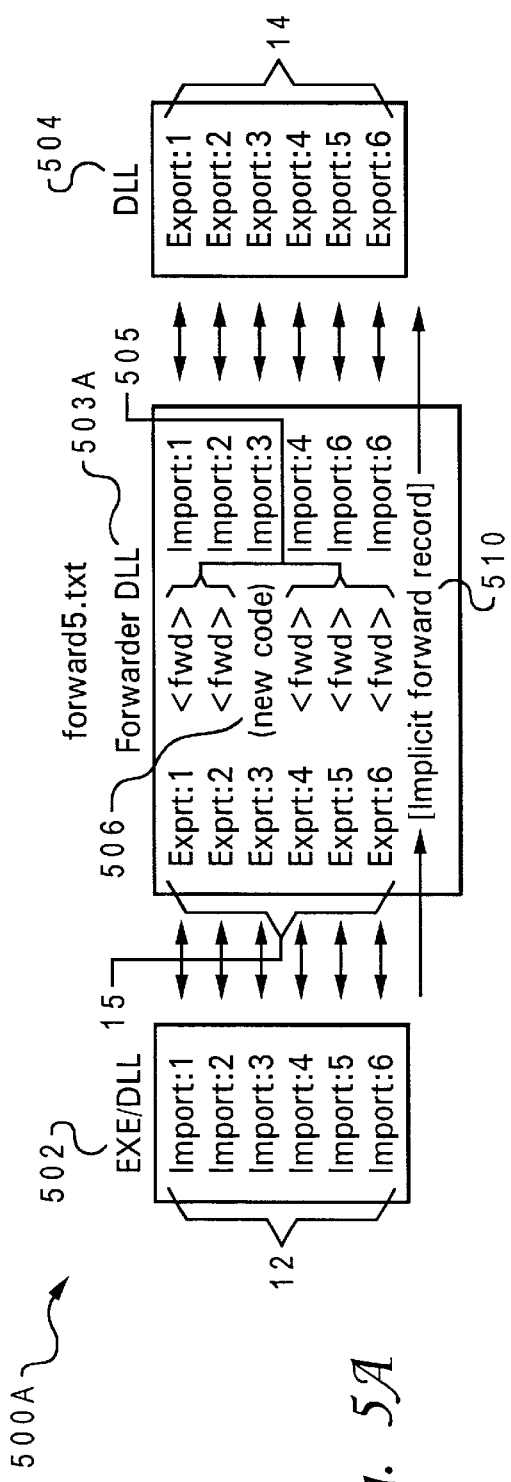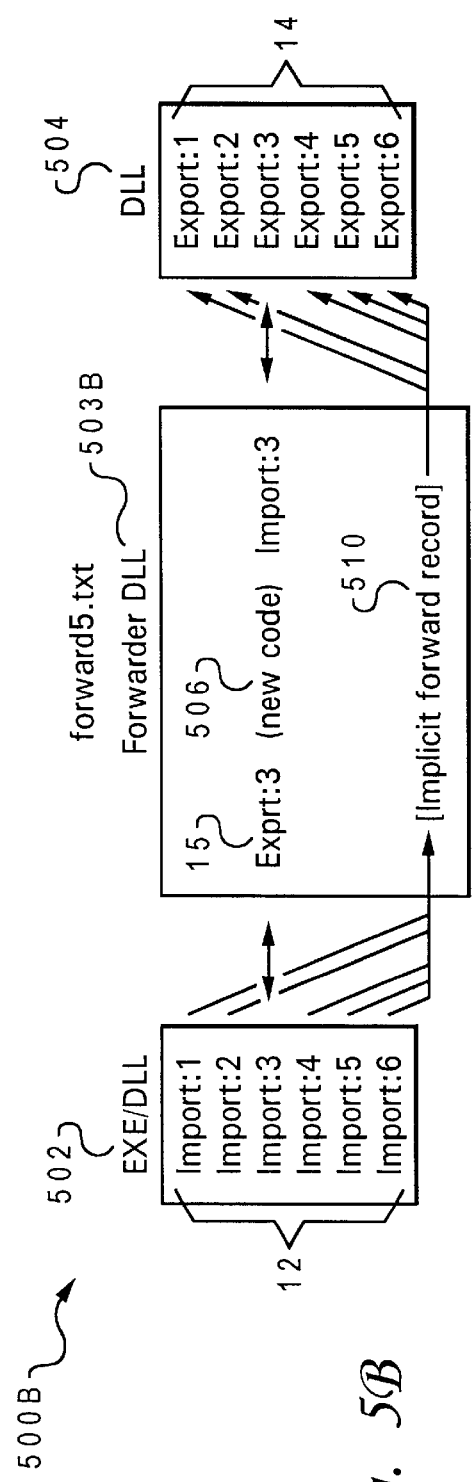
Fig. 5A
Fig. 5B

IMPLICIT FORWARDING AND RESOLVING OF A REFERENCE MADE BY AN IMPORTING MODULE TO AN EXPORTING MODULE FOR A SPECIFIED EXPORT

BACKGROUND OF THE INVENTION

1. Technical Field

The present invention relates in general to the loading of importing modules during load time, and in particular to forwarding and resolving a reference made by an importing module to an exporting module for a specified export wherein the resolution of the reference is made during the load time of the importing module. Still particularly, the present invention relates to implicit forwarding and resolving of a reference made by an importing module to an exporting module for a specified export wherein the resolution of the reference is made during the load time by a loader of the importing module.

2. Description of the Related Art

"Executable files" (EXEs) or "dynamic link libraries" (DLLs) may be importing modules that import exports from other modules or may be exporting modules that provide exports that are referenced by other modules. The loading of an importing module that references a specified export in an exporting module requires that the location of the specified export be known in order for the loading process to be completed by the loader. These specified exports may contain functions, data, or any other suitable information that an importing module would need to reference during loading and execution of the importing module. If the importing module is directly referencing an exporting module that has the specified export(s), then the location(s) of the specified export(s) is/are known by the loader during the time of loading the importing module, and the loading of the importing module is able to be completed by the loader. Prior art FIG. 1 shows a configuration 100 with an original importing module 102 (i.e. original executable file or dynamic link library (EXE/DLL)) referencing an original exporting module (i.e. dynamic link library (DLL)) 104. The importing module 102 makes the references 12 for importing the specified exports 14 (i.e. exports 1, 2, 3, 4, 5, and 6), and the original exporting module (i.e. the original DLL) 104 has the respective specified exports 14 (i.e. exports 1, 2, 3, 4, 5, and 6) that are referenced by the importing module 102. Thus, the locations of all of the specified exports 14 referenced by the importing module 102 are able to be directly provided to and known by the loader, and the loading of the importing module 102 is able to be completed by the loader.

However, an export can either be an ordinary export of the module (code or data) or a re-export of an import, that is, an explicit forwarder entrypoint which does not refer to anything contained within the module but tells the loader to "forward" references to that export elsewhere. Import references to an explicit forwarder entrypoint are resolved by the loader operating as if the import referring to the explicit forwarder entrypoint actually refers to the module and export from which the explicit forwarder entrypoint imports. The explicit entrypoints are used by the loader to find and determine the location(s) of the specified export so that the loading of the importing module is able to be completed by the loader. An explicit entrypoint is located in the exporting module and may be an explicit forwarder entrypoint that forwards the reference of the specified export to a next exporting module or may export contents of the module. If the location(s) of the specified export(s) is/are found at a particular exporting module(s), then a correlation(s) between the importing module and that particular exporting module(s) is/are made. The "fix up" process of a reference(s) is performed by the loader to resolve all reference(s) to a specified export(s) through explicit entrypoint(s), and resolution for all reference(s) must be resolved before the loader is able to complete the loading of the importing module at load time, or otherwise, the loading of the importing module is unable to be completed by the loader. Thus, any reference (s) made to an explicit entrypoint(s) must be fixed up or resolved during the load time of the importing module.

Therefore, these exporting modules with explicit forwarder entrypoints that are used to forward references for specified exports have various limitations and problems. Prior art FIG. 2 shows a configuration 200 between the original importing module (i.e. original EXE/DLL) 102 making references 12 for specific exports 15 (i.e. specific exports 1, 2, 3, 4, 5, and 6) of the exporting module (forwarder DLL 203) having an ordinary export of code or data 206 and explicit forwarder entrypoints 205 (i.e. explicit forwarder entrypoints 1, 2, 4, 5, and 6), which when imported are resolved by the loader to exports 14 of the original DLL 104. Since the importing module 102 is making references 12 to the exporting module 203 that is a forwarder exporting module or DLL with explicit forwarder entrypoints 205 (i.e. forwarder entrypoints 1, 2, 4, 5, and 6), the loader resolves the references and finds and determines the locations of the specified exports 14 and export 206 by resolving the explicit forwarder entrypoints 205 and export 206 by correlating the importing module 102 to exporting module 104 for finding and locating the exports 14 and export 206. In FIG. 2, the locations of the specified exports 14 (i.e. exports 1, 2, 4, 5, and 6) are found in the exporting module or original DLL 104, and the correlation between the importing module or original EXE/DLL 102 and the exporting module or original DLL 104 is made. This correlation is made by the loader to perform the "fix up" process to resolve the references and obtain the specific locations of the specified exports 14. Since all of the imports have been resolved via the explicit forwarder entrypoints 205 (i.e. forwarder entrypoints 1, 2, 4, 5, and 6) and export 206, the loader is able to load the importing module 102 at load time.

For the purposes of illustration in the present description, the term "older" connotes or correlates to less entrypoints while the term "newer" connotes or correlates to more entrypoints. Prior art FIG. 3 illustrates an example block configuration 300 of a problem when a newer importing module or newer EXE/DLL 302 and a newer exporting module or newer DLL 304 are used with the same forwarder exporting module or forwarder DLL 203 as in FIG. 2. FIG. 3 shows that some of the references 12 made by the newer importing module 302 for specified exports 14 (i.e. exports 1, 2, 4, 5, and 6) are able to be resolved by the loader in finding the locations of these specified exports 14 in the newer DLL 304 by being able to correlate the importing module 302 to the exporting module 304 by the loader resolving the explicit forwarder entrypoints 205. The export 206 (i.e. export 3) is also able to be resolved by the loader in the same manner that was discussed earlier for export 206 in FIG. 2.

However, the references made by the newer importing module 302 to the forwarder exporting module or forwarder DLL 203 for the newer specified exports 34 (i.e. exports 7 and 8) cannot at all be resolved since explicit forwarder entrypoints 205 or direct exports or any other explicit entrypoints do not exist in the forwarder exporting module or forwarder DLL 203 for these specified exports 7 and 8.

Thus, the loader is unable to load the newer importing module 302 during the load time since all references for exports made by the importing module 302 are unable to be resolved. While older importing modules 102 such as shown in FIGS. 1 and 2 that reference the forwarder DLL 203 and that do not reference and require specified exports 7 or 8 are able to load, any importing module that references the forwarder DLL 203 and that does reference new specified exports, such as new specified exports 7 and 8, which are unable to be resolved will not be able to load by the loader.

Prior art FIG. 4 illustrates an example block configuration 400 of another problem in that a newer forwarder exporting module or forwarder DLL 403 is used with an original importing module or older EXE/DLL 102 and an original exporting module or older DLL 104. In this example, the newer forwarder exporting module 403 is broken and unable to be loaded by the loader when used with the original exporting module 104. The forwarder exporting module 403 has various explicit forwarder entrypoints 205 and 405 and export 206. In FIG. 4, the forwarder exporting module 403 has unresolvable imports, explicit forwarder entrypoints 405 that refer to exports that do not exist in the original exporting module or DLL 104. Generally, no problem exists for the original importing module or EXE/DLL 102 since the original importing module or EXE/DLL 102 does not use extra exports 405 from the forwarder exporting module 403. However, the forwarder exporting module or DLL 403 cannot load since all its imports, particularly entrypoints 405 for the specified exports 7 and 8, are not able to be resolved by the loader since they do not exist in the exporting module or DLL 104. Thus, since the forwarder exporting module or DLL 403 is unable to be loaded by the loader during load time, the original importing module or EXE/DLL 102 that is dependent on the forwarder exporting module or DLL 403 also cannot load.

These above or such similar situations arise when particular software installations, changes, or upgrades are made or occur, such as installing a new version of an operating system or a program. The forwarder may end up being an older or newer version depending on the software installations, changes, or upgrades made.

Furthermore, prior art FIG. 9 shows a block diagram configuration 900 wherein an original importing module or EXE/DLL 902 makes references 12A, 12B, and 12C for respective specified exports 14A, 14B, and 14C from various respective exporting modules or DLLs 904A, 904B, and 904C. However, the references 12A, 12B, and 12C made for specified exports 14A, 14B, and 14C from various respective exporting modules or DLLs 904A, 904B, and 904C may raise data management and performance issues. For better management, it may be desirable to combine the exports, code, and data of multiple DLLs (i.e. DLLs 904A, 904B, and 904C) into one DLL while maintaining the original DLL names and exports, typically as explicit forwarder entries for compatibility.

It would therefore be advantageous to improve the way a reference is forwarded from an importing module to an exporting module. It would further be advantageous and desirable to provide a system and method that allows forwarding of a reference(s) through a forwarder exporting module for a specified export(s) when an explicit forwarder entrypoint(s) does/do not exist for the specified export(s) in the forwarder exporting module and to still allow correlation of the specified export(s) to the importing module and the exporting module that has the specified export when the loader is loading the importing module during a load time. It would also be advantageous and desirable to allow an importing module that references an exporting module(s) for a specified export(s) to be able to be completely loaded by the loader during load time regardless of the versions of the importing module and/or exporting module(s). It would further be advantageous and desirable to provide implicit forwarding and resolving of references made by an importing module to a forwarder exporting module for specified exports at another exporting module when the importing module is being loaded by the loader during load time. It would also be advantageous and desirable to enhance and improve at least some of the ways that importing modules (i.e. EXEs/DLLs) and exporting modules (i.e. DLLs) are being used, such as merging and splitting various exporting modules or DLLs and cascading a chain of forwarder exporting modules or DLLs.

SUMMARY OF THE INVENTION

It is therefore an object of the present invention to improve the way a reference is forwarded from an importing module to an exporting module.

It is a further object of the present invention to provide a system and method that allows forwarding of a reference(s) through a forwarder exporting module for a specified export(s) when an explicit forwarder entrypoint(s) does/do not exist for the specified export(s) in the forwarder exporting module and to still allow correlation of the specified export(s) to the importing module and the exporting module that has the specified export when the loader is loading the importing module during a load time.

It is also an object of the present invention to allow an importing module that references an exporting module(s) for a specified export(s) to be able to be completely loaded by the loader during load time regardless of the versions of the importing module and/or exporting module(s).

It is another object of the present invention to provide implicit forwarding and resolving of references made by an importing module to a forwarder exporting module for specified exports at another exporting module when the importing module is being loaded by the loader during load time.

It is still another object of the present invention to enhance and improve at least some of the ways that importing modules (i.e. EXEs/DLLs) and exporting modules (i.e. DLLs) are being used, such as merging and splitting various exporting modules or DLLs and cascading a chain of forwarder exporting modules or DLLs.

The foregoing objects are achieved as is now described. The present system and method improves the way of forwarding a reference from an importing module to an exporting module. The present system and method allow forwarding of a reference(s) through a forwarder exporting module for a specified export(s) when an explicit entrypoint(s) does/do not exist for the specified export(s) in the forwarder exporting module and still allow correlation from the importing module to the exporting module when the loader is loading the importing module during a load time. One or more implicit forwarder record(s) is stored in the exporting module by a linker. Each implicit forwarder record designates a respective target module. The loader determines whether an explicit entrypoint exists in the exporting module for the reference of the specified export. The loader resolves the reference by using the explicit entrypoint to determine a location of the specified export if the explicit entrypoint exists. The loader searches in a defined sequential order for the location of the specified export in a target module designated by a respective implicit forwarder record if the explicit entrypoint does not exist. The loader resolves the reference by using the implicit forwarder record if the specified export is found in a target module.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a prior art example block diagram illustrating an importing module making references to an exporting module for specified exports wherein the exporting module has all of the specified exports;

FIG. 2 is a prior art example block diagram illustrating an importing module making references for specified exports to a forwarder exporting module that has explicit forwarder entrypoints which are used to forward the references to another exporting module that has all of the specified exports wherein all of the references and the forwarder entrypoints are able to be resolved by the loader;

FIG. 3 is a prior art example block diagram illustrating the problem of when a newer importing module makes references for specified exports to a forwarder exporting module having fewer explicit entrypoints than references being made for specified exports wherein the importing module is unable to be loaded by a loader at load time since all references to the forwarder exporting module are unable to be resolved;

FIG. 4 is a prior art example block diagram illustrating the problem of when an older importing module makes references for specified exports to a newer forwarder exporting module wherein the forwarder exporting module references an older exporting module that has fewer specified exports than explicit forwarder entrypoints in the forwarder exporting module and the forwarder exporting module is unable to load due to the unresolved explicit forwarder entrypoints and the importing module is unable to load due to its dependent on the forwarder exporting module;

FIG. 5A is an example block diagram showing the present invention implicit forwarder record incorporated into an exporting module;

FIG. 5B is another example block diagram showing the present invention implicit forwarder record incorporated into another exporting module;

DETAILED DESCRIPTION OF ILLUSTRATIVE EMBODIMENT

Figure 5C:
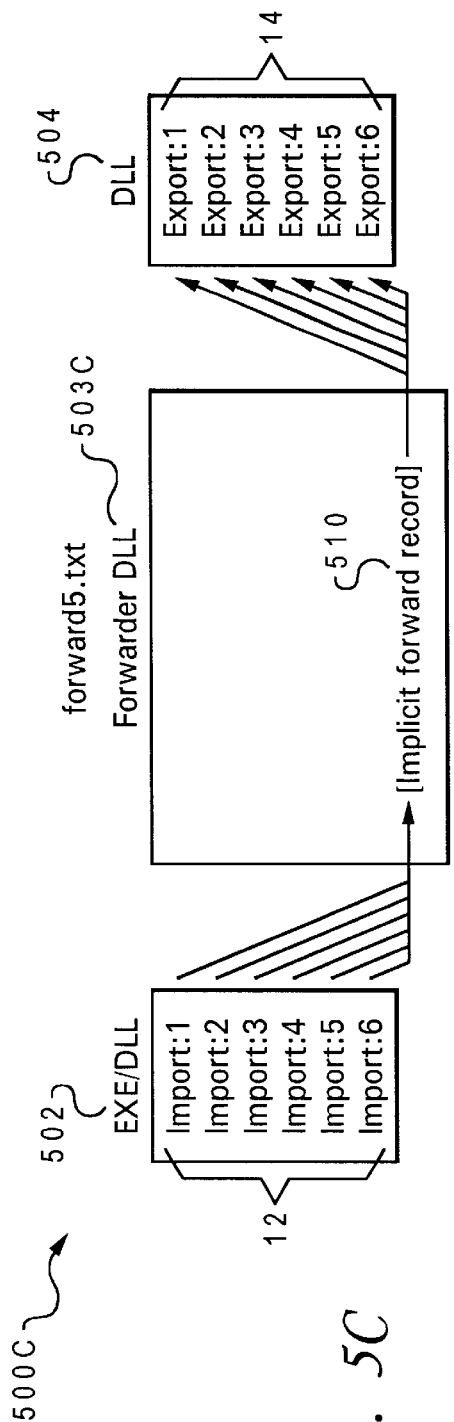
FIG. 5C is still a further example block diagram showing the present invention implicit forwarder record incorporated into still another exporting module.

The present invention provides an improved way of forwarding a reference from an importing module to an exporting module. The present invention also provides a system and method that allows forwarding of a reference(s) through a forwarder exporting module for a specified export(s) when an explicit entrypoint(s) does/do not exist for the specified export(s) in the forwarder exporting module and to still allow correlation from the importing module to the exporting module when the loader is loading the importing module during a load time. An explicit entrypoint is located in the exporting module and may be an explicit forwarder entrypoint that forwards the reference of the specified export to a next exporting module or may be a direct export for the specified export thereat. The present system and method allow an importing module that references an exporting module(s) for a specified export(s) to be able to be completely loaded by the loader during load time regardless of the version of the forwarding module(s).

Furthermore, the present invention provides implicit forwarding and resolving of references made by an importing module to a forwarder exporting module for specified exports at another exporting module when the importing module is being loaded by the loader during load time. The present invention enhances and improves at least some of the ways that importing modules (i.e. EXEs/DLLs) and exporting modules (i.e. DLLs) are being used, such as merging and splitting various exporting modules or DLLs and cascading a chain of forwarder exporting modules or DLLs.

With reference now to the figures and in particular with reference to FIG. 5A, an example block diagram configuration 500A is shown wherein the present invention implicit forwarder record 510 is incorporated into an exporting module 503A. The block diagram 500A of FIG. 5A is similar to the block diagram configuration 200 of FIG. 2. The block diagram configuration 500A shows the importing module 502 making references 12 for specified exports 15 to the forwarder exporting module or DLL 503A that has the explicit forwarder entrypoints 505, the export 506, and also the present invention implicit forwarder record 510. In this configuration 500A, the addition and storage of the implicit forwarder record 510 into the forwarder exporting module 503A is shown. The configuration 500A may be a typical arrangement wherein the present invention implicit forwarder record 510 is simply added to a pre-existing forwarder exporting module or DLL (i.e. presently existing forwarder exporting module is adapted to use the present invention forwarder record 510). The implicit forwarder record 510 does not affect or intrude with the operation by the loader in handling existing explicit forwarder entrypoints 505 or export 506 with new code. The implicit forwarder record 510 is not used by a loader in this case since explicit forwarder entrypoints 505 and export 506 exist for all of the references 12 made by the importing module 502 for specified exports 15 which when imported are resolved by the loader to the exports 14 of the DLL 504. Thus, forwarding and resolving of the references 12 are handled by the loader in the same manner as they were handled in the configuration 200 of FIG. 2 as described earlier in the description of the related art. Otherwise, if an explicit forwarder entrypoint 505 or export 506 or other such explicit entrypoint were missing or did not exist for a specified export(s) 14 referenced by the importing module 502, then the implicit forwarder record 510 would be used by the loader to handle the forwarding of references) 12 for specified export(s) 14 that do not have associated and respective explicit forwarder entrypoint(s) 505 or direct export(s) 506 or other such explicit entrypoint(s) in the forwarder exporting module 503A. In this example, the implicit forwarder record 510 designates the exporting module or DLL 504 as the respective target module that is searched by the loader for the respective specified export 14 in the event that a forwarder entrypoint 505 or direct export 506 or other such explicit entrypoint does not exist for the specified export 14 in the forwarder exporting module 503A. In this example, the explicit forwarder entrypoints 505 exist due to backwards compatability obligations of the original modules.

With reference now to the figures and in particular with reference to FIG. 5B, another example block diagram configuration 500B is shown wherein the present invention implicit forwarder record 510 is incorporated into an exporting module 503B. The block diagram configuration 500B of FIG. 5B is similar to the block diagram configuration 500A of FIG. 5A except that the forwarder exporting module 503B does not have the explicit forwarder entrypoints 505 for the exports 1, 2, 4, 5, and 6 that the forwarder exporting module 503A of FIG. 5A has, and it only has the specified export 15 (i.e. export 506), which replaces export 3 with new code. FIG. 5B shows that the export 506 acts as an entrypoint for export 3 so that the loader knows during load time that the export 506 with new code replaces export 3 when the importing module 502 makes a reference 12 for the export 3. The remaining references 12 for specified exports 14 are handled by the loader through the use of the implicit forward record 510. The implicit forward record 510 designates the exporting module or DLL 504 as the target module that is searched by the loader for the remaining specified exports 14 since explicit forwarder entrypoint(s) 505 and/or direct export(s) 506 or any other such explicit entrypoint do not exist for the remaining specified exports 14 in the forwarder exporting module 503B.

With reference now to the figures and in particular with reference to FIG. 5C, a further example block diagram configuration 500C is shown wherein the present invention implicit forwarder record 510 is incorporated into an exporting module 503C. The block diagram configuration 500C of FIG. 5C is similar to the block diagram configuration 500B of FIG. 5B except that the forwarder exporting module 503C also does not have the specified export 15 (i.e. export 506) for replacing export 3 with new code that the forwarder exporting module 503B of FIG. 5B has. All references 12 for specified exports 14 are handled by the loader through the use of the implicit forward record 510. The implicit forward record 510 designates the exporting module or DLL 504 as the target module that is searched by the loader for the remaining specified exports 14 since explicit forwarder entrypoint(s) 505 or direct export(s) 506 or any other such explicit entrypoint(s) do not exist for any of the specified exports 14 in the forwarder exporting module 503C.

Figure 6:
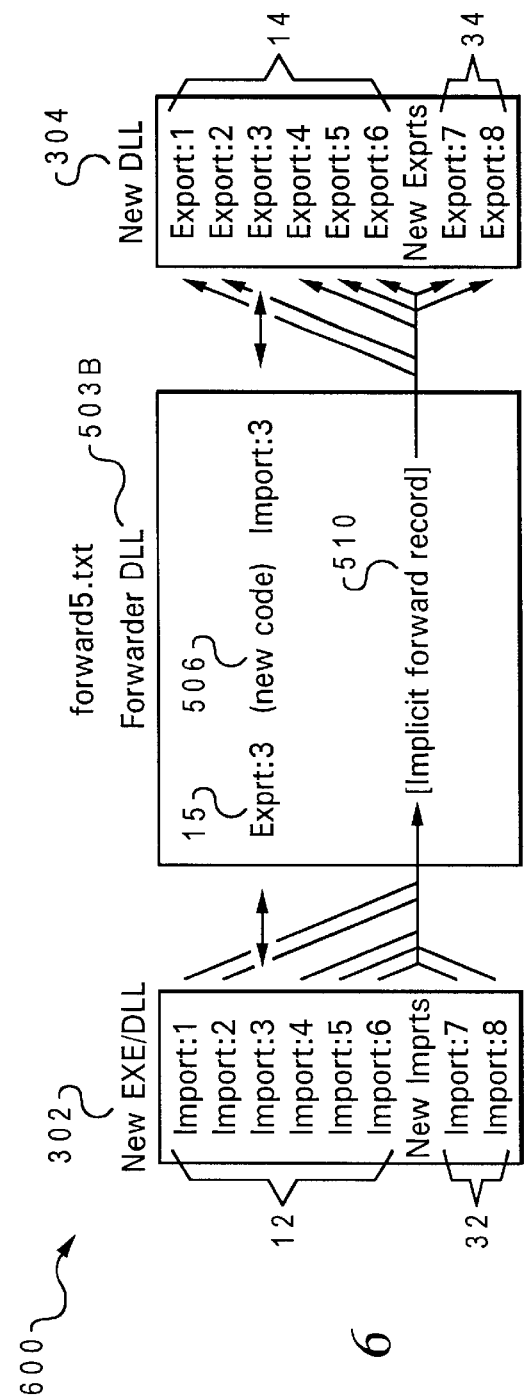
FIG. 6 is the block diagram of FIG. 3 that additionally shows the present invention implicit forwarder record incorporated into the forwarder exporting module to overcome the loading problem of the configuration in FIG. 3.

With reference now to the figures and in particular with reference to FIG. 6, a block diagram configuration 600, which is similar to the block diagram configuration 300 of FIG. 3, is shown except that the explicit forwarder entrypoints do not exist in the forwarder exporting module or DLL 503B. The block diagram configuration 600 shows the newer importing module or EXE/DLL 302, which references the same present forwarder exporting module or DLL 503B as in FIG. 5B and which, in turn, references the newer exporting module 304. A linker creates and constructs the physical modules for the newer importing module or EXE/DLL 302, the forwarder exporting module or DLL 503B, and the newer exporting module or DLL 304 based on definitions created by a programmer(s) for these modules. The linker also creates, constructs, and defines based on pre-programmed definitions the forwarder exporting module 503B with the export 506 having the new code and the implicit forwarder record 510 having the designated target module 304 to be searched when an explicit forwarder entrypoint or direct export does not exist for a specified export 14 or 34. After the linker creates and constructs the modules, FIG. 6 shows that the references 12 and 32 made by the newer importing module 302 are resolved by the loader directly to export 506 for the export 3 in the forwarder DLL 503B and via the implicit forwarder record 510 for the exports 14 and 34 (i.e. exports 1, 2, 4, 5, 6, 7, and 8) in the newer DLL 304. The implicit forward record 510 designates the exporting module or DLL 304 as the target module that is used and searched by the loader for the specified exports 14 and 34 since explicit forwarder entrypoint(s) 505 or direct export(s) 506 or any other such explicit entrypoint(s) do not exist for the specified exports 14 in the forwarder exporting module 503B. FIG. 6 shows that the additional references 32 by the newer importing module 302 for newer exports 34 are handled and resolved by the loader through the implicit forwarder record 510 wherein the designated target module 304 is searched for the specified exports 34 and the correlation is made from the importing module 302 to the target exporting module 304 to locate and find the specified exports 34 thereat by the loader.

In FIG. 6, additional implicit forwarder record(s) may also exist and be stored in the forwarder exporting module 503B. Each of these additional implicit forwarder record(s) designates a different target module (i.e. different exporting module or DLL) that is to be used and searched by the loader if the specified export is unable to be located and found in the target exporting module 304 designated by the implicit forwarder record 510. The various designated target modules in the additional implicit forwarder records are used and searched by the loader in a sequential order. For example, if a specified export 14 or 34 is not able to be found in the target module 304 designated by the implicit forwarder record 510, then the loader moves to searching a next target module respectively designated by a next implicit forwarder record for the specified export 14 or 34. This sequential order of searching is able to be continued by the loader in the other target module(s) respectively designated by the other additional implicit forwarder record(s) (not shown) that are stored in the forwarder exporting module 503B until hopefully the referenced, specified export is found.

Figure 7:
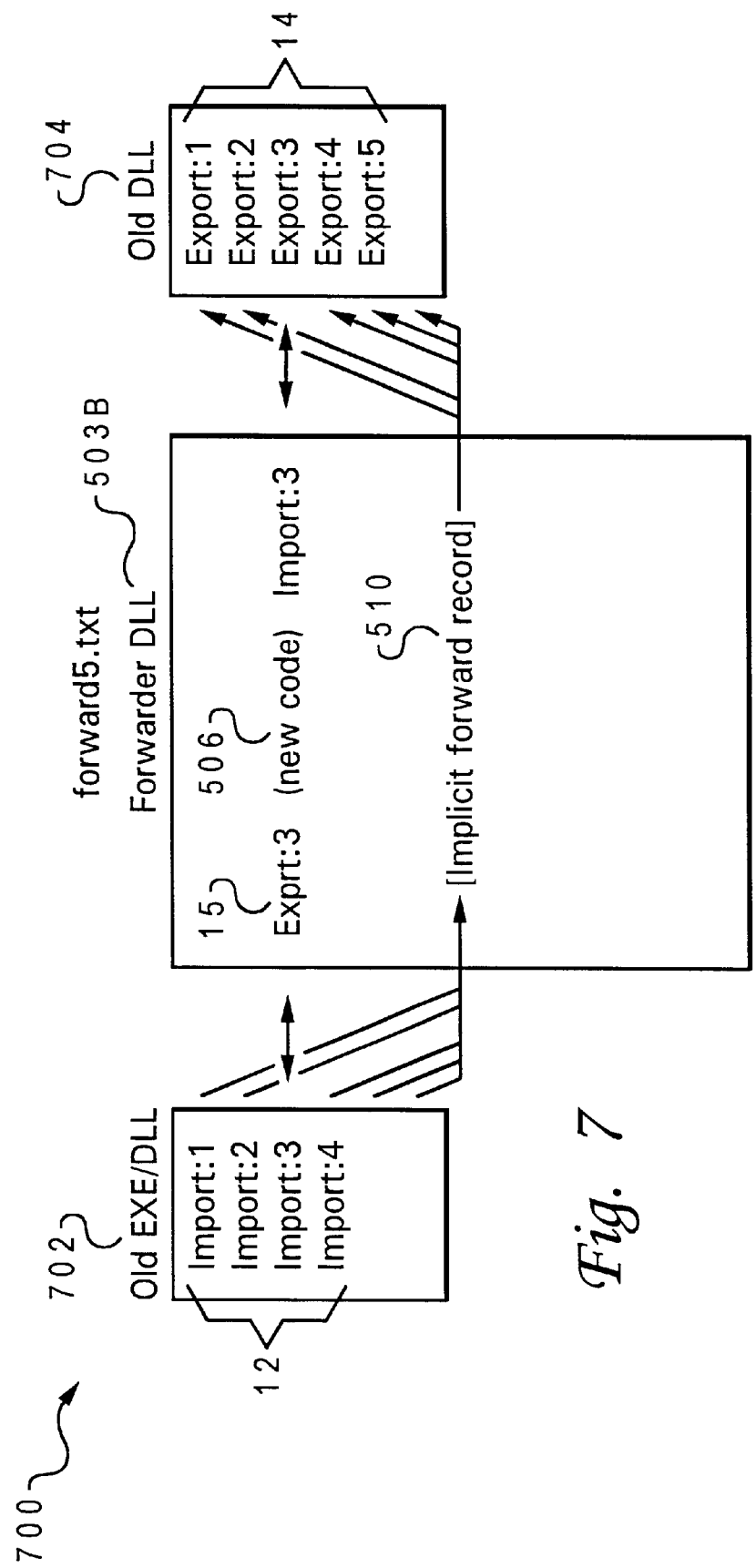
FIG. 7 is the block diagram of FIG. 4 that additionally shows the present invention implicit forwarder record incorporated into the forwarder exporting module to overcome the loading problem of the configuration in FIG. 4.

With reference now to the figures and in particular with reference to FIG. 7, a block diagram configuration 700, which is similar to the block diagram configuration 400 of FIG. 4, is shown except that the explicit forwarder entrypoints do not exist in the forwarder exporting module 503B, which is the same forwarder exporting module in FIG. 5B. The block diagram configuration 700 shows the older importing module or EXE/DLL 702, which references a forwarder exporting module or DLL 503B and which, in turn, references an older exporting module 704. The older importing module 702 makes references 12 to the forwarder exporting module or DLL 503B for the specified exports 1, 2, 3, and 4 (i.e. specified exports 14). The older exporting module 704 has the exports 1, 2, 3, 4, and 5 (i.e. exports 14). FIG. 7 shows that the export 506 acts as an entrypoint for export 3 so that the loader knows during load time that the export 506 with new code replaces export 3 when the older importing module 702 makes a reference 12 for the export 3. Explicit forwarder entrypoints for the specified exports 1, 2, and 4 do not exist in the forwarder exporting module 503B in this example of FIG. 7. The implicit forwarder record 510 in the forwarder exporting module 503B allows the loader to resolve all references 12 to the specified exports 14 and avoids the possibility of any extra unresolved and non-correlated entrypoints existing in the forwarder exporting module or DLL 503B that were problematic for loading the forwarder exporting module 403 in configuration 400 of FIG. 4. Thus, since nothing is missing in the forwarder exporting module 503B for the example of FIG. 7, the forwarder exporting module 503B is able to be loaded by a loader, and the older importing module 402 depending on the forwarder exporting module 503B is also able to be loaded by the loader during load time. Thus, the present invention forwarder exporting module 503B with implicit forwarder record 510 is used and referenced as necessary for resolving any references.

Figure 8:
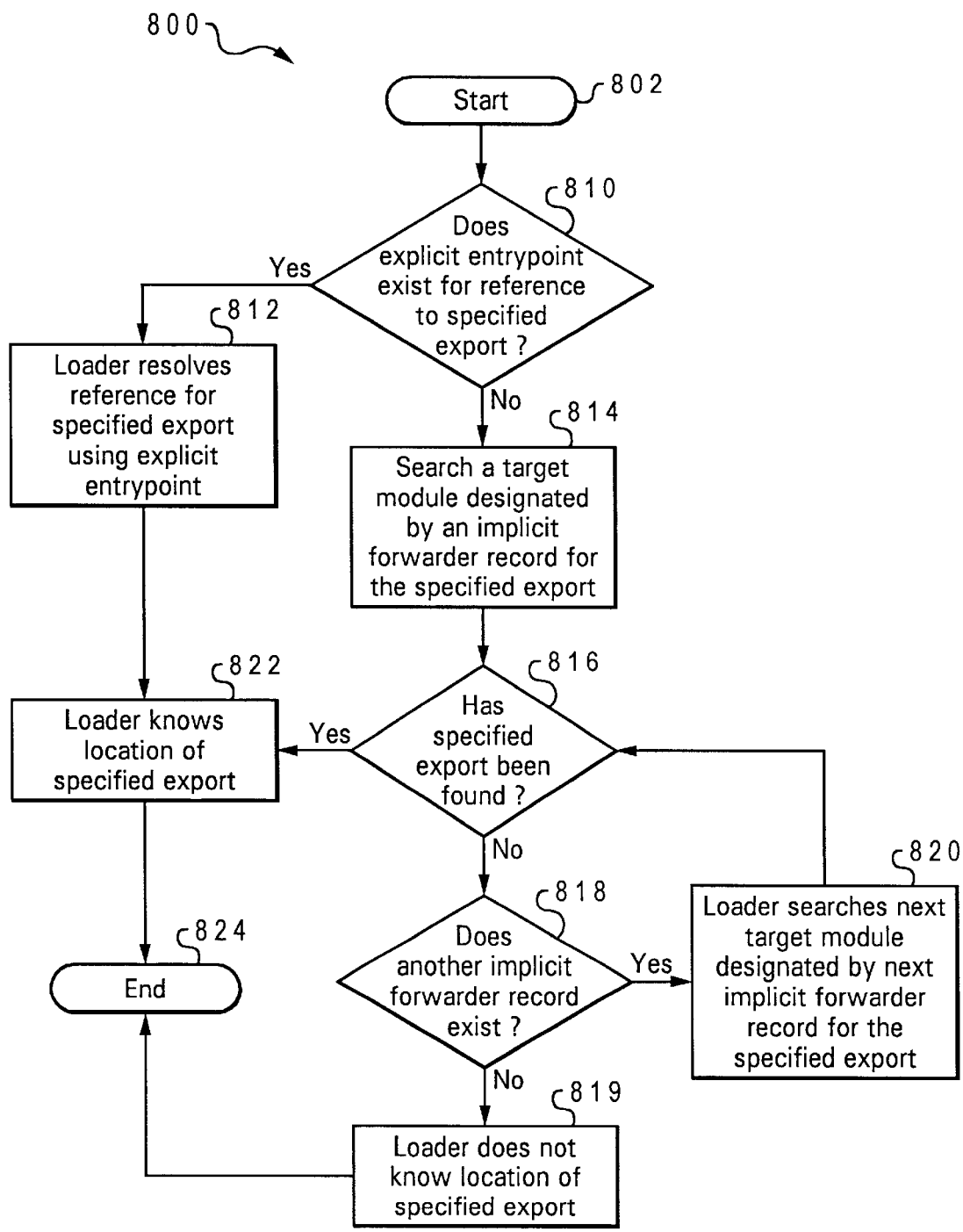
FIG. 8 is a flow chart of an example method for forwarding and resolving a reference made by an importing module to an exporting module with the present invention implicit forwarder record.

With reference now to the figures and in particular with reference to FIG. 8, a flow chart of a method 800 for forwarding and resolving a reference made by an importing module to an exporting module for a specified export is shown. The method 800 starts at block 802. The method moves to decision block 810 where the method 800 determines whether an explicit entrypoint (i.e. explicit forwarder entrypoint or direct export for the specified export) exists in the exporting module for the reference to the specified export. If such an explicit entrypoint exists, then the method 800 moves to block 812 where the loader forwards and/or resolves the reference for the specified export using the explicit entrypoint, and the method 800 then moves to block 822 where the loader knows the location of the specified export. The method 800 ends at block 824. However, if such an explicit entrypoint does not exist at decision block 810, then the method 800 moves to block 814 where the loader searches a target module designated by an implicit forwarder record for the specified export. A sequential order may set forth the order of searching the different target modules for the specified export by the loader. The method 800 then moves to decision block 816.

At decision block 816, the method 800 determines whether the specified export has been found in the target module. If the specified export has been found, then the method 800 moves to block 822 where the loader knows the location of the specified export and to block 824 where the method 800 ends. On the other hand, if the specified export has not been found in the target module at decision block 816, then the method 800 moves to decision block 818. At decision block 818, the method 800 determines whether another implicit forwarder record exists in the exporting module. If another implicit forwarder record does exist, then the method 800 moves to block 820 where the loader searches for the specified export in a next target module designated by a next implicit forwarder record in the exporting module (may be based on a sequential order), and the method 800 loops back to decision block 816 and continues therefrom. However, if such another implicit forwarder record does not exist at decision block 818, then the method 800 moves to block 819 where the loader does not know the location of the specified export and will not be able to load the importing module. The method 800 then ends at block 824.

Figure 9:
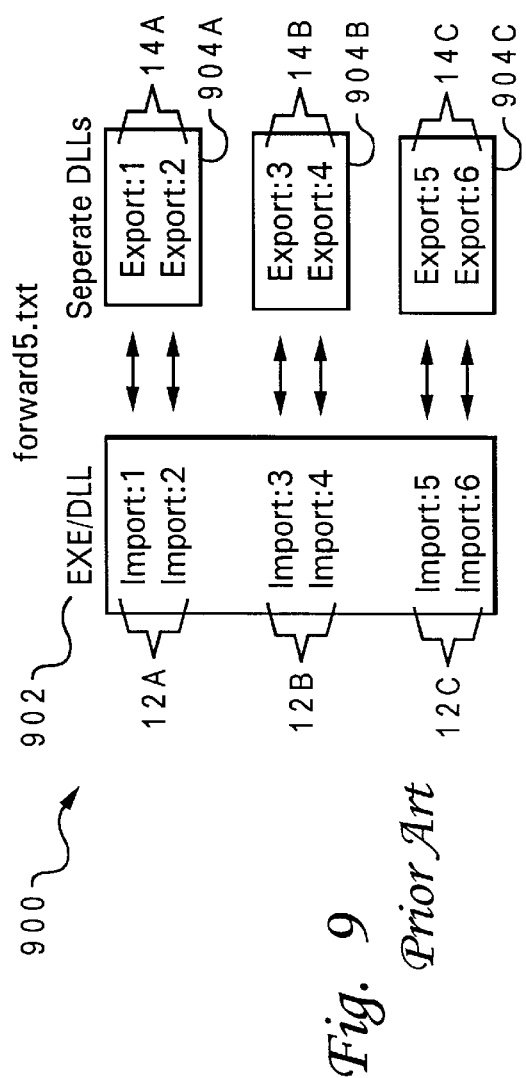
FIG. 9 is a prior art diagram illustrating an importing module making references for specified exports in a plurality of exporting modules.

As stated earlier, FIG. 9 shows a prior art block diagram 900 of an original importing module or EXE/DLL 902 making references 12A, 12B, and 12C for respective specified exports 14A, 14B, and 14C in various corresponding exporting modules or DLLs 904A, 904B, and 904C. However, for reasons stated earlier (particularly performance reasons), it may be desired to merge and compact code of the various exporting modules or DLLs 904A, 904B, and 904C into a single exporting module or DLL. Thus, it is desirable to integrate these multiple exporting modules or DLLs into a single exporting module or DLL to improve processing performance.

Figure 10:
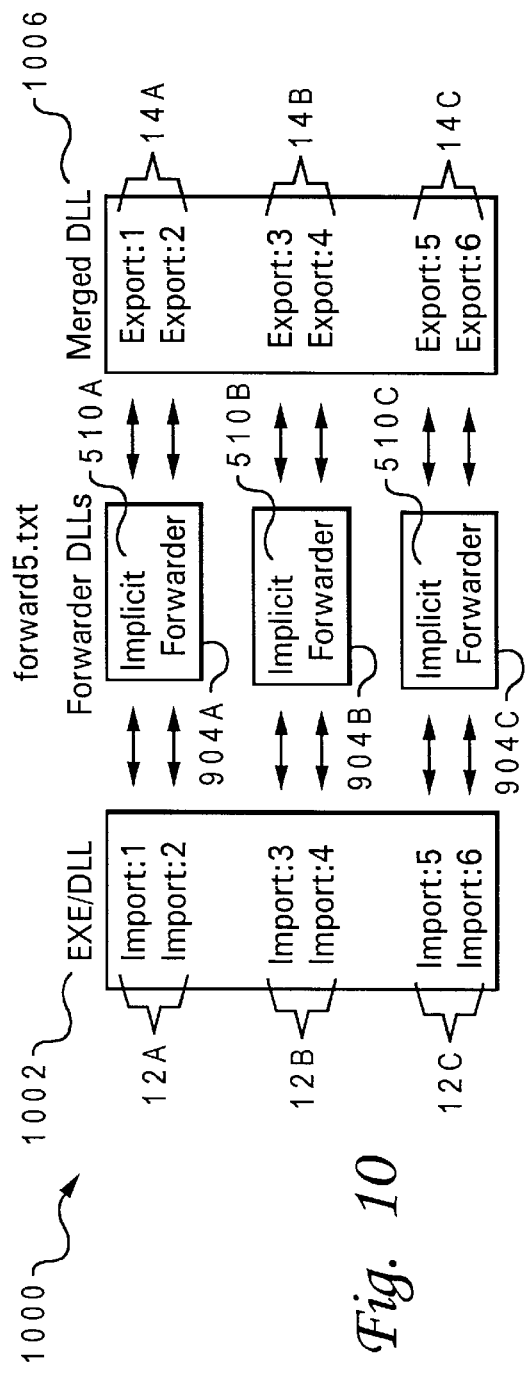
FIG. 10 is a block diagram of using the present invention implicit forwarder records to merge various exporting modules into a single exporting module.

FIG. 10 shows a block diagram 1000 of using the present invention implicit forwarder records 510A, 510B, and 510C to enhance, improve, and simplify the merging of various exporting modules or DLLs 904A, 904B, and 904C into a single exporting module or DLL 1006. With reference now to the figures and in particular with reference to FIG. 10, the exports 14A (i.e. exports 1 and 2), exports 14B (i.e. exports 3 and 4), and exports 14C (i.e. exports 5 and 6) of the respective multiple exporting modules or DLLs 904A, 904B, and 904C as shown in FIG. 9 are transferred to a single merged DLL 1006, and the implicit forwarder records 510A, 510B, and 510C replace the exports and are respectively stored in the exporting modules or DLLs 904A, 904B, and 904C wherein the exporting modules or DLLs 904A, 904B, and 904C now respectively act as forwarders to the single, merged exporting module or DLL 1006. The implicit forwarder records 510A, 510B, and 510C all designate the merged exporting module or DLL 1006 as the target module to be searched for the exports. In effect, any reference 12A, 12B, or 12C made by the importing module 1002 to the exporting module or DLL 904A, 904B, or 904C for a specified export(s) will instruct the loader to use the implicit forwarder record 510A, 510B, or 510C, and the respective implicit forwarder record 510A, 510B, or 510C directs the loader to search the target module 1006 for the referenced, specified export. Thus, the present invention implicit forwarder record each used in a plurality of exporting modules allows the contents of a plurality of exporting modules to be merged into a single module while leaving the original DLLs as version independent forwarders.

Figure 11:
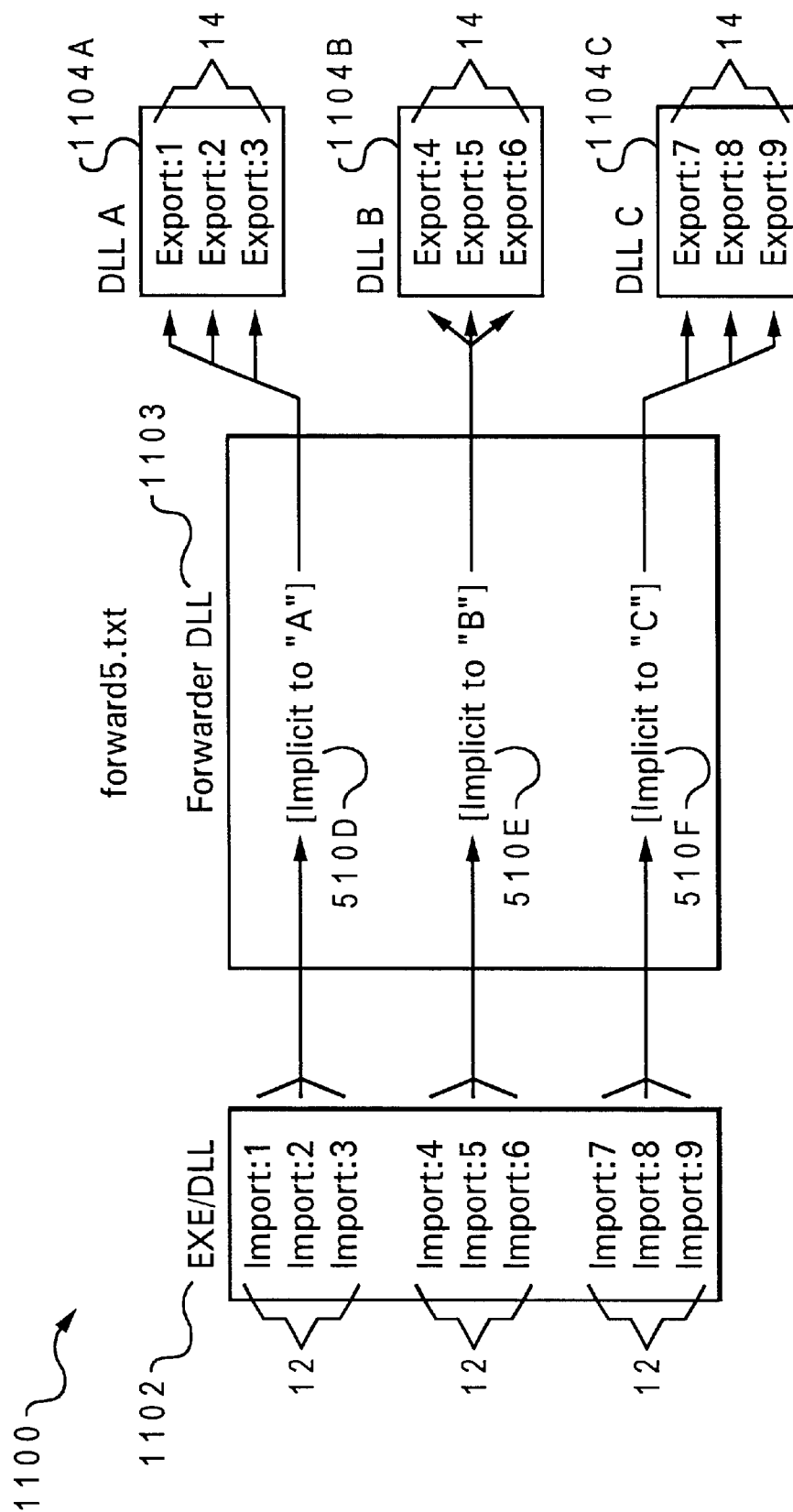
FIG. 11 is a block diagram of using the present invention implicit forwarder records to split a single exporting module into various exporting modules.

FIG. 11 shows a block diagram 1100 of using the present invention implicit forwarder records 510D, 510E, and 510F to enhance, improve, and simplify the splitting of a single exporting module or DLL (i.e. forwarder DLL) 1103 into various exporting modules or DLLs 1104A, 1104B, and 1104C. At times, a single exporting module DLL 1103 comprises a significant or large amount of data or information. For data management purposes, it may be desirable to split or divide the single large exporting module or DLL 1103 into smaller, more-manageable exporting modules or DLLs 1104A, 1104B, and 1104C. With reference now to the figures and in particular with reference to FIG. 11, the splitting of the exporting module or DLL 1103 into the exporting module or DLL 1104A (i.e. DLL A), the exporting module or DLL 1104B (i.e. DLL B), and the exporting module or DLL 1104C (i.e. DLL C) is shown by dividing and transferring exports from the single exporting module or DLL 1103 into the respective exporting modules or DLLs 1104A, 1104B, and 1104C. Respective implicit forwarder records 510D, 510E, and 510F are stored into the single exporting module or DLL 1103 wherein the exporting module or DLL 1103 now acts as a forwarder to the exporting modules or DLLs 1104A, 1104B, and 1104C. The implicit forwarder record 510D designates the exporting module or DLL 1104A as the target module to be searched by the loader for references 12 made by the importing module 1102 for specified exports 1, 2, and 3. The implicit forwarder record 510E designates the exporting module or DLL 1104B as the target module to be searched by the loader for references 12 made by the importing module 1102 for specified exports 4, 5, and 6. The implicit forwarder record 510F designates the exporting module or DLL 1104C as the target module to be searched by the loader for references 12 made by the importing module 1102 for specified exports 7, 8, and 9.

Figure 12:
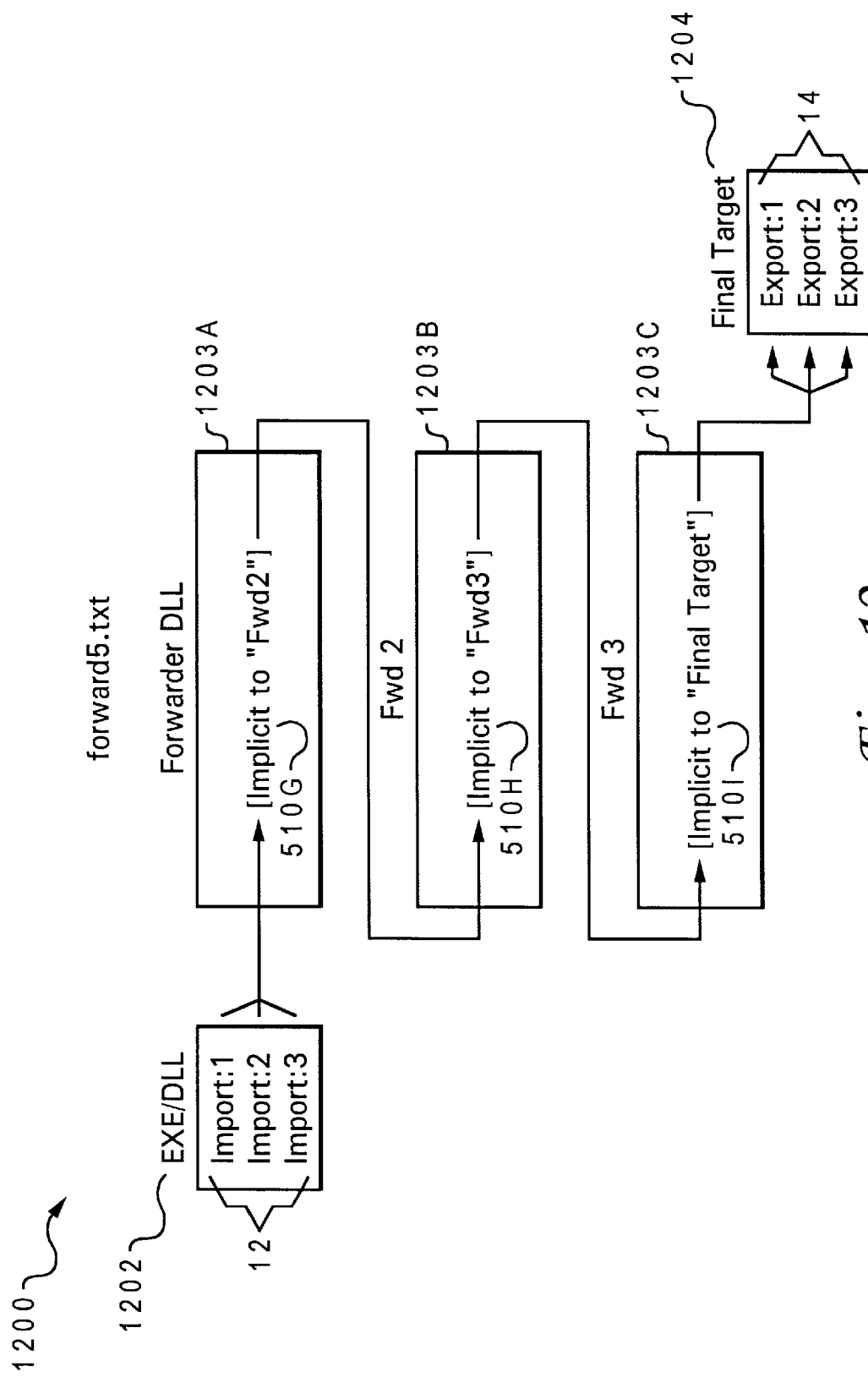
FIG. 12 is a block diagram of using the present invention implicit forwarder records for cascading a chain of forwarder exporting modules.

With reference now to the figures and in particular with reference to FIG. 12, forwarding to forwarders and creating or cascading a chain of forwarders is also able to be enhanced, improved, and simplified by using the present invention implicit forwarder records. FIG. 12 shows a block diagram 1200. The block diagram 1200 illustrates a reference 12 made by the importing module or EXE/DLL 1202 for a specified export 14 being forwarded by a loader from the importing module or EXE/DLL 1202 to the exporting module or forwarder DLL 1203A. The exporting module or forwarder DLL 1203A has an implicit forwarder record 510G that designates the exporting module or "Fwd 2" forwarder DLL 1203B as the target module. The reference is then forwarded by the loader to the exporting module or Fwd 2 forwarder DLL 1203B. The Fwd2 forwarder 1203B has an implicit forwarder record 510H that designates the exporting module or "Fwd 3" forwarder DLL 1203C as the target module. The reference is then forwarded by the loader to the exporting module or Fwd 3 forwarder DLL 1203C. The exporting module or Fwd3 forwarder DLL 1203C has an implicit forwarder record 510I that designates the exporting module or "Target" DLL 1204 having the specified exports 14 as the target module. The reference is then finally forwarded by the loader to the final Target 1204. When a reference 12 is made for a specified export 14 by the importing module 1202, the loader then resolves using the implicit forwarder records 510G, 510H, and 510I and knows to search the Target 1204 for the specified export 14.

Many other configurations, applications, and uses of the present invention implicit forwarder records exist, and the present invention is not in any way limited to any particular configuration, application or use.

While the invention has been particularly shown and described with reference to a preferred embodiment, it will be understood by those skilled in the art that various changes in form and detail may be made therein without departing from the spirit and scope of the invention.

What is claimed is:

1. A method of forwarding and resolving a reference made by an importing module to an exporting module for a specified export, comprising the steps of:
    storing in the exporting module at least one implicit forwarder record wherein each of the at least one implicit forwarder record designates a respective one of at least one target module,
    determining whether an explicit entrypoint exists in the exporting module for the reference of the specified export,
    resolving the reference by using the explicit entrypoint to determine a location of the specified export if the explicit entrypoint exists,
    searching for the location of the specified export in the respective one of the at least one target module designated by the at least one implicit forwarder record if the explicit entrypoint does not exist, and
    resolving the reference by using the at least one implicit forwarder record if the explicit entrypoint does not exist and if the specified export is found in the at least one target module.

2. The method according to claim 1, wherein the storing step further comprises the steps of:
    using a linker to store the at least one implicit forwarder record in the exporting module based on definitions for the exporting module, and
    using the linker to create the exporting module based on the definitions that have been set for the exporting module.

3. The method according to claim 1, wherein the steps of determining whether a explicit entrypoint exists, resolving the reference by using the explicit entrypoint, searching for the location of the specified export, and resolving the reference by using the at least one implicit forwarder record are performed by a loader at load time while attempting to load the importing module.

4. The method according to claim 1, further comprising the steps of:
    in response to a loader resolving all references made for exports by the importing module, loading the importing module by the loader.

5. The method according to claim 1, wherein the step of resolving the reference by using the at least one implicit forwarder record further comprises the step of:
    determining and correlating an exact location of the specified export to the importing module if the exact location of the specified export is found in the at least one target module.

6. The method according to claim 1, wherein the at least one implicit forwarder record is a multiple number of implicit forwarder records, and wherein the at least one target module comprises multiple target modules, and wherein each of the implicit forwarder records designates a respective target module, said step of resolving the reference by using the at least one implicit forwarder record comprising:
    searching the multiple target modules in a sequential order for the location of the specified export, and
    resolving the reference if the specified export is found among the multiple target modules.

7. The method according to claim 1, wherein the importing module is an executable file.

8. The method according to claim 1, wherein the importing module is a dynamic link library.

9. The method according to claim 1, wherein the exporting module is a dynamic link library and each of the at least one target module is a dynamic link library.

10. The method according to claim 1, wherein the exporting module is an executable file and each of the at least one target module is a dynamic link library.

11. The method according to claim 1:
    wherein the exporting module comprises various dynamic link libraries each having a respective implicit forwarder record that each identically designates a merged dynamic link library as the at least one target module,
    wherein the merged dynamic link library has merged and stored therein exports for the various dynamic link libraries, and
    wherein the reference to one of the various dynamic link libraries for the specified export is forwarded from the importing module to the merged dynamic link library to search, find, and resolve the specified export among the exports in the merged dynamic link library.

12. The method according to claim 1:

wherein the at least one implicit forwarder record in the exporting module is a number of implicit forwarder records, wherein the at least one target module is various dynamic link libraries that correspond to the number of implicit forwarder records in the exporting module, and wherein exports of the at least one target module are split and stored among the various dynamic link libraries and are respectively forward referenced by the implicit forwarder records.

13. The method according to claim 1:

wherein the exporting module further comprises a cascaded chain of exporting modules in which each of the exporting modules stores and uses a respective one of the at least one implicit forwarder record that designates a respective one of the at least one target module in order to form the cascaded chain and wherein the reference is forwarded through the cascaded chain of the exporting modules to find and correlate an exact location of the specified export to the importing module.

14. A system for forwarding and resolving a reference made by an importing module to an exporting module for a specified export, comprising:

means for storing in the exporting module at least one implicit forwarder record wherein each of the at least one implicit forwarder record designates a respective one of at least one target module, means for determining whether an explicit entrypoint exists in the exporting module for the reference of the specified export, means for resolving the reference by using the explicit entrypoint to determine a location of the specified export if the explicit entrypoint exists, means for searching for the location of the specified export in the respective one of the at least one target module designated by the at least one implicit forwarder record if the explicit entrypoint does not exist, and means for resolving the reference by using the at least one implicit forwarder record if the explicit entrypoint does not exist and if the specified export is found in the at least one target module.

15. The system according to claim 14, wherein the means for storing further comprises:

means for using a linker to store the at least one implicit forwarder record in the exporting module based on definitions for the exporting module, and means for using the linker to create the exporting module based on the definitions that have been set for the exporting module.

16. The system according to claim 14, wherein the means for determining whether a explicit entrypoint exists, the means for resolving the reference by using the explicit entrypoint, the means for searching for the location of the specified export, and the means for resolving the reference by using the at least one implicit forwarder record comprise a loader for loading said importing module.

17. The system according to claim 14, further comprising:

means, responsive to resolving all references made for exports by the importing module, for loading the importing module by a loader.

18. The system according to claim 14, wherein the means for resolving the reference by using the at least one implicit forwarder record further comprises:

means for determining and correlating an exact location of the specified export to the importing module if the exact location of the specified export is found in the at least one target module.

19. The system according to claim 14, wherein the at least one implicit forwarder record comprises multiple implicit forwarder records, and wherein the at least one target module comprises multiple target modules, and wherein each of the implicit forwarder records designates a respective one of the target modules, wherein said means for resolving said reference by using the at least one implicit forwarder record comprises:

means for searching the multiple target modules in a sequential order for the location of the specified export, and means for resolving the reference if the specified export is found among the multiple number of target modules.

20. The system according to claim 14, wherein the importing module is an executable file.

21. The system according to claim 14, wherein the importing module is a dynamic link library.

22. The system according to claim 14, wherein the exporting module is a dynamic link library and each of the at least one target module is a dynamic link library.

23. The system according to claim 14, wherein the exporting module is an executable file and each of the at least one target module is a dynamic link library.

24. The system according to claim 14:

wherein the exporting module further comprises various dynamic link libraries each having a respective implicit forwarder record that each identically designates a merged dynamic link library as the at least one target module, wherein the merged dynamic link library has merged and stored therein exports for the various dynamic link libraries, and wherein the reference to one of the various dynamic link libraries for the specified export is forwarded from the importing module to the merged dynamic link library to search, find, and resolve the specified export among the exports in the merged dynamic link library.

25. The system according to claim 14:

wherein the at least one implicit forwarder record in the exporting module is a number of implicit forwarder records, wherein the at least one target module is various dynamic link libraries that correspond to the number of implicit forwarder records in the exporting module, and wherein exports of the at least one target module are split and stored among the various dynamic link libraries and are respectively forward referenced by the implicit forwarder records.

26. The system according to claim 14:

wherein the exporting module further comprises a cascaded chain of exporting modules in which each of the exporting modules stores and uses a respective one of the at least one implicit forwarder record that designates a respective one of the at least one target module in order to form the cascaded chain and wherein the reference is forwarded through the cascaded chain of the exporting modules to find and correlate an exact location of the specified export to the importing module.

* * * * *